United States Patent [19]

Takayama

[11] Patent Number: 4,680,648
[45] Date of Patent: Jul. 14, 1987

[54] INFORMATION SIGNAL REPRODUCING APPARATUS
[75] Inventor: Nobutoshi Takayama, Kanagawa, Japan
[73] Assignee: Canon Kabushiki Kaisha, Tokyo, Japan
[21] Appl. No.: 663,863
[22] Filed: Oct. 23, 1984
[30] Foreign Application Priority Data
Oct. 24, 1983 [JP] Japan ................. 58-199783
Oct. 24, 1983 [JP] Japan ................. 58-199784
[51] Int. Cl.⁴ .................. H04N 5/783; G11B 21/10
[52] U.S. Cl. ................... 360/10.2; 360/77; 360/70; 360/10.3; 360/73; 360/64
[58] Field of Search .......... 360/77, 70, 10.3, 10.2, 360/73, 64, 18

[56] References Cited
U.S. PATENT DOCUMENTS 4,056,832 11/1977 Boer ............................ 360/77
4,370,685 1/1983 Hosoi ...................... 360/DIG. 1
4,489,352 12/1984 Kobayashi .................. 360/10.3
4,549,234 10/1985 Sakamoto ................... 360/10.2

Primary Examiner—Alan Faber
Attorney, Agent, or Firm—Toren, McGeady & Associates

[57] ABSTRACT

An information signal reproducing apparatus, which is arranged to reproduce an information signal from recording tracks formed on a record bearing medium one after another in a direction intersecting the moving direction of the medium with different pilot signals repeatedly superimposed on the information signal, is provided with: Moving apparatus for moving the medium in the direction intersecting the recording tracks; apparatus for generating a first signal in association with the medium moving action of the moving apparatus; reproducing apparatus for reproducing from the medium the information signal and the different pilot signals; apparatus for generating a second signal corresponding to the repeating period of these pilot signals; and apparatus for detecting the pitch of the recording tracks through the first and second signals.

20 Claims, 18 Drawing Figures

FIG.5(a) V0
FIG.5(b)
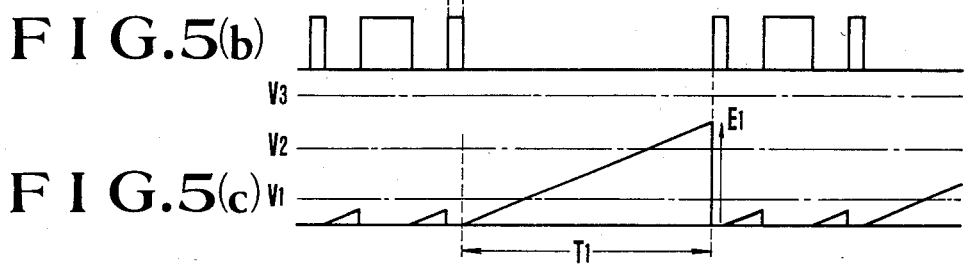
FIG.5(c) V1
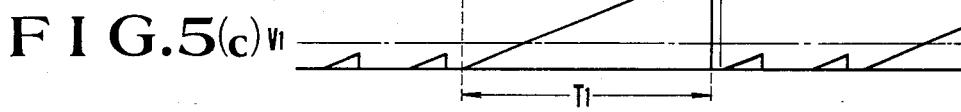
FIG.5(d) V0
FIG.5(e)
FIG.5(f) V1
FIG.5(g) V0
FIG.5(h)
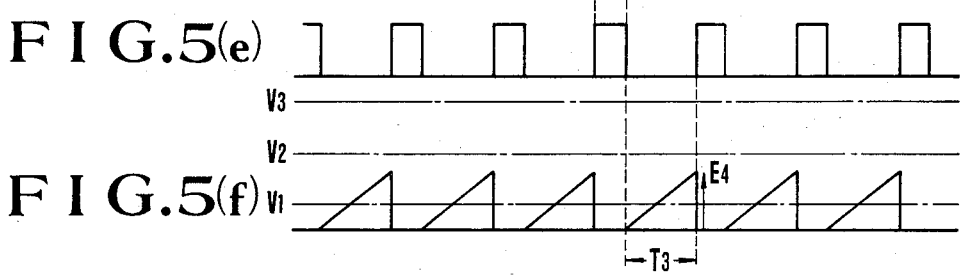
FIG.5(i) V1

INFORMATION SIGNAL REPRODUCING APPARATUS

BACKGROUND OF THE INVENTION

1. Field of the Invention

This invention relates to an information signal reproducing apparatus and more particularly to an apparatus provided with means for detecting a distance or pitch between recording tracks which are formed, one after another, on a record bearing medium in a direction intersecting the moving direction of the record bearing medium.

2. Description of the Prior Art

With regard to the apparatus of the above-stated kind, there have been known magnetic recording/reproducing apparatus (hereinafter called VTR's) which record with a rotary head a video signal on a magnetic tape forming recording tracks obliquely thereon, one after another, with one field portion of the video signal thus recorded in each of the tracks. These known VTR's include a type in which the distance between recording tracks (hereinafter referred to as the track pitch or TP for short) is determined by selecting a tape moving speed in carrying out recording on the tape. In reproducing the recorded video signal, the track pitch is detected and a tape moving speed and a head to be used are automatically determined, ensuring satisfactory reproduction. In this specification, the invention is described with VTR's of this type used as examples.

Heretofore, a VTR of this type has been arranged such that: In carrying out a recording operation, a tracking control signal is recorded in the direction of the moving tape in relation to recording tracks formed at the end of the tape or in relation to a recording video signal. In carrying out a reproducing operation, this control signal is reproduced to find the frequency thereof. The tape moving speed employed for recording, or the TP, is detected from the frequency. A reproducing head and a tape moving speed are controlled based on the result of detection, automatically ensuring satisfactory reproduction.

Meanwhile, as a result of a recent tendency to reduce the size of VTR's and to increase recording density, there have been proposed VTR's of the type in which pilot signals for tracking control are recorded in the video signal recording tracks by superimposing them on the video signal instead of recording the above control signal. Generally, in this type of VTR, a plurality of pilot signals of different kinds are superimposed on each of the recording tracks, one after another. A tracking control signal for reproduction is obtained by detecting a level difference between the cross-talk components of the pilot signals obtained from adjacent recording tracks during reproduction. Furthermore, during recent years, there have been proposed VTR's of the type in which a rotary head is mounted on an electric-mechanical conversion element or a piezoelectric element such as a bimorph element. The head is shifted in a direction perpendicular to the rotating direction thereof in such a manner that the recording tracks can be accurately traced by the head even in the event of a varied speed reproducing operation such as slow motion reproduction, high speed searching reproduction, etc. The VTR of that type is capable of giving a reproduced picture of excellent quality since, unlike the conventional VTR's of other types, no noise bar arises even during varied speed reproduction. A shortcoming of the VTR of that type, however, lies in that the head shifting means, such as the above-stated electric-to-mechanical conversion element or the like, must be controlled by means of a control signal based on the reproduction speed and the TP.

While the VTR using the above-stated pilot signals for tracking control permits an increase in recording density, the absence of the control signal mentioned in the foregoing deprives the VTR of any signal that is directly repressentative of the TP. The TP is, thus, not automatically detected and the tape speed employable for recording, or the TP, has been limited in general to one value.

In the VTR which is capable of carrying out the above varied speed reproduction on the other hand, the control signal must be varied with the TP. Therefore, in cases where varied TP values are to be used for recording, the VTR necessitates the provision of many different control signals. Generally, the slant or inclination of the control signal is in proportion to the number of recording tracks to be crossed by the head during one field period. In order to obtain this slant, a so-called still pattern signal, having a slant which causes the head shifting means to be shifted the extent of one TP during one field period, is subtracted from a signal having a slant corresponding to the tape moving speed. This still pattern signal varies with the TP. Therefore, in order to obtain a control signal for the head shifting means, a VTR having a plurality of different TP values necessitates an arrangement for preparing still pattern signals by counting the outputs of an oscillator having a plurality of oscillating frequency values corresponding to the recording TP values.

It is an object of the present invention to provide an information signal reproducing apparatus which is capable of eliminating the shortcomings of the prior art apparatus mentioned in the foregoing and which is arranged so that the distance or pitch between recording tracks is detectable even where there is no signal indicating the distance between the recording tracks.

It is another object of the invention to provide an information signal reproducing apparatus which is capable of producing a good reproduced information signal by accurately detecting the distance between recording tracks.

It is a further object of the invention to provide an information signal reproducing apparatus which is always capable of producing a good reproduced information signal regardless of the distance between the recording tracks and the travelling speed of a record bearing medium.

These and further objects and features of the invention will become apparent from the following detailed description of preferred embodiments thereof taken in conjunction with the accompanying drawings.

SUMMARY OF THE INVENTION

To attain the objects of the invention, an information signal reproducing apparatus, which embodies an aspect of this invention and reproduces an information signal from recording tracks formed on a record bearing medium one after another in a direction interesecting the moving direction of the medium with different pilot signals repeatedly superimposed on the information signal, is provided with moving means for moving the record bearing medium in the direction intersecting the recording tracks; first generating means for generating a first signal relative to the moving action of the moving means on the medium; reproducing means for reproducing from the medium the different pilot signals; second generating means for generating a second signal corresponding to the repeating period of these pilot signals reproduced by the reproducing means; and detecting means for detecting the pitch of the recording tracks through the first and second signals.

BRIEF DESCRIPTION OF THE DRAWINGS

FIGS. 5(a)-5(i) show, in a timing chart, the operation of the circuit shown in FIG. 3.

DETAILED DESCRIPTION OF THE PREFERRED EMBODIMENTS

Figure 1:
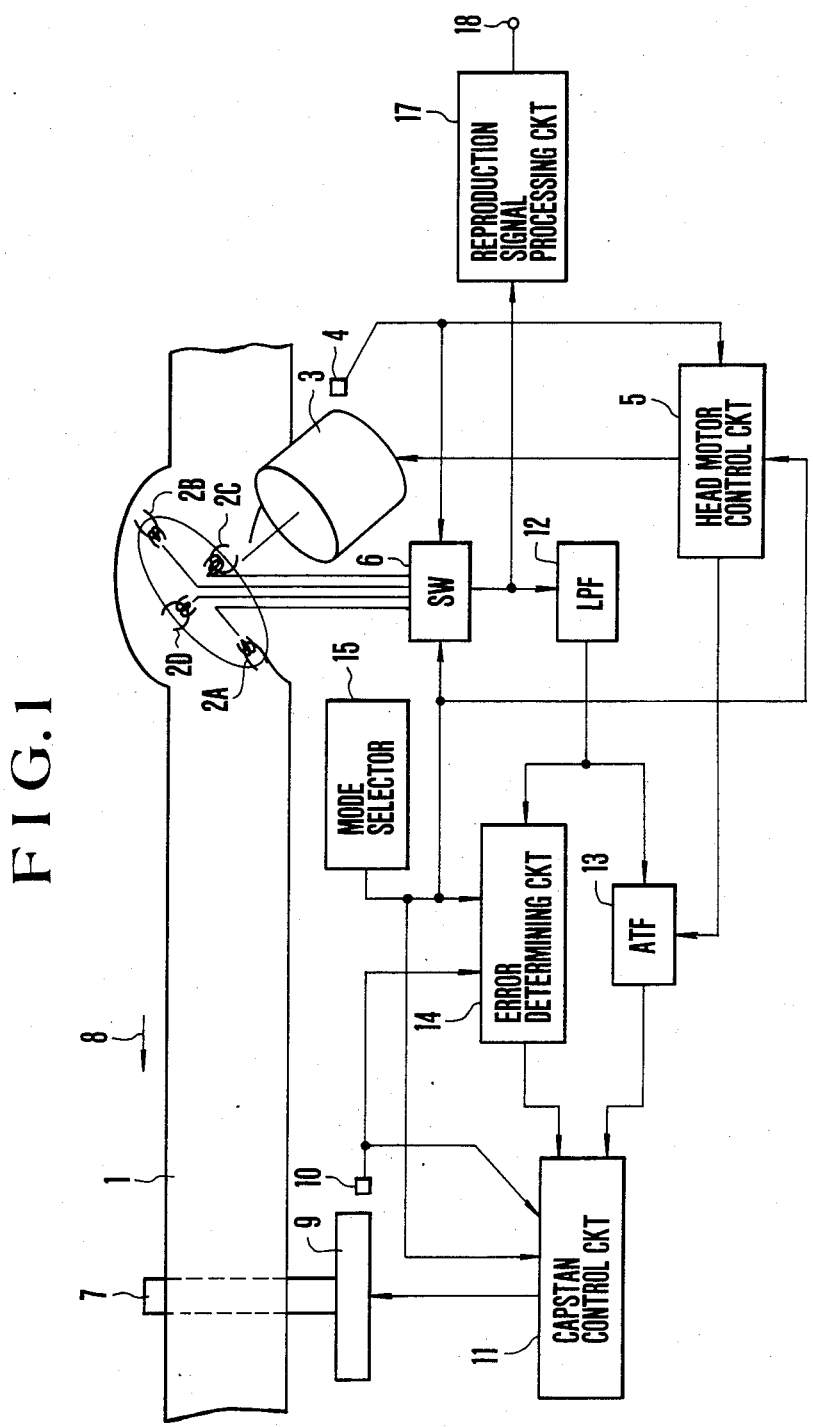
FIG. 1 is a schematic diagram of a reproducing system of a VTR arranged according to the present invention in an embodiment thereof.

In the following, some preferred embodiments of the present invention are described with reference to the accompanying drawings:

FIG. 1 shows the outline of the reproducing system of a VTR arranged in an embodiment of the present invention. The illustration includes a magnetic tape 1 and magnetic heads 2A, 2B, 2C and 2D. The heads 2A and 2B are of the same head width and have different azimuth angles. The heads 2C and 2D are of the same head width and also have different azimuth angles. The head width of the heads 2A and 2B is wider than that of the heads 2C and 2D. The heads 2A and 2B reproduce an information signal recorded at a high tape traveling speed, forming a record pattern of a wide TP value (hereinafter referred to as a short time mode). The heads 2C and 2D reproduce an information signal recorded at a low tape speed, forming a record pattern of a narrow TP value (hereinafter referred to as a long time mode). A head motor 3 rotates these heads 2A, 2B, 2C and 2D. A head motor rotation detector 4 produces pulses relative to the rotation of the head motor 3. A head motor control circuit 5 rotates the head motor 3 at a constant speed and at a predetermined phase on the basis of the pulses produced from the rotation detector 4. A head change-over switch 6 reproduces signals obtained from the heads 2A and 2B or the heads 2C and 2D into a continuous signal. This switch 6 is operated based on the pulses produced from the rotation detector 4. A capstan 7 moves the tape 1 in the direction of arrow 8 in conjunction with a pinch roller (not shown). The capstan 7 is provided with a capstan fly-wheel 9. A fly-wheel rotation detector 10 detects the rotation of the fly-wheel 9 and produces a pulse signal (hereinafter referred to as FG) corresponding to the detected rotation. A capstan control circuit 11 controls the capstan 7 having the heads 2A, 2B, 2C and 2D accurately trace recording tracks formed on the tape 1. A low-pass filter 13 (hereinafter referred to as LPF) separates pilot signals superimposed on a reproduction signal RF obtained through the head change-over switch 6. A tracking control circuit 13 (hereinafter referred to as an ATF circuit) obtains a tracking control signal from reproduced pilot signals after they are processed through the LPF 12. An error detecting circuit 14 detects a distance between recording tracks and determines or judges whether a reproducing tape speed which is designated by a mode selector 15 coincides with the tape 1 speed employed for recording. A reproduction signal processing circuit 17 obtains a video signal of the original form thereof from the reproduction signal RF. An output terminal 18 has the reproduced video signal produced therethrough.

Figure 2:
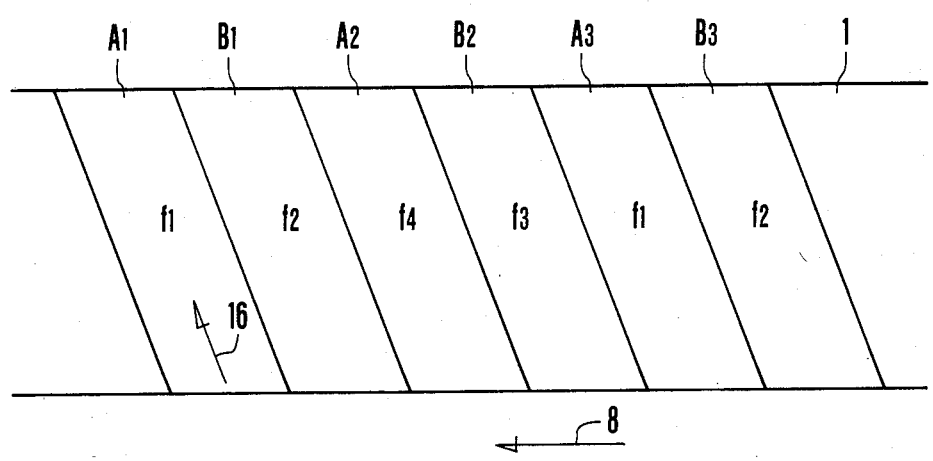
FIG. 2 is a schematic illustration of a recording track pattern formed on a magnetic tape with different tracking pilot signals superimposed on a recorded video signal.

FIG. 2 shows a pattern of recording tracks formed on the magnetic tape 1 in the short time mode with different pilot signals superimposed on a video signal there. Recording tracks A1, A2 and A3 are formed by a head having the same azimuth angle as the head 2A. Other recording tracks B1, B2 and B3 are formed by a head having the same azimuth angle as the head 2B. The pilot signals superimposed on the video signal of these recording tracks A1, A2, A3, B1, B2, B3 are of frequency values f1, f2, f4 and 43. Each of these tracks A1, A2, A3, B1, B2, B3 are arranged to be traced in the direction of arrow 16.

In reproducing the recorded video signal, the recording tracks A1, B1, A2, B2, A3, B3,—are traced, one after another, by the two heads 2A and 2B which are of different azimuth angles. During this reproducing operation, the pilot signals having the frequency values f1, f2, f4, f3, f1, f2,—(hereinafter the pilot signal will be referred to as signals f1, f2, f4 and f3) are also reproduced, one after another. The frequency values of these pilot signals f1, f2, f4 and f3 are far below the frequency band of the video signal and remain unaffected by the azimuth angles and have no azimuth loss. During the reproducing operation, if the track width of the heads 2A and 2B is a little larger than the TP, the pilot signals f1, f2, f4 and f3 which are recorded in two adjacent tracks A1, B1, A2, B2, A3, B3 on both sides of a track A1, A2, A3, B1, B2, B3 which is mainly traced (the main track) are also reproduced in addition to the pilot signal f1, f2, f4 and f3 recorded in the main track. The ATF circuit 13 of FIG. 1 obtains an accurate tracking error signal including the direction and degree of tracking deviation by detecting the reproduced levels of the pilot signals f1, f2, f4, and f3 obtained from the two adjacent tracks A1, B1, A2, B2, A3, B3. The ATF signal thus is supplied to the capstan control circuit 11 to control the travel of the tape 1 caused by the capstan 7, so that tracking can always be accurately accomplished during reproduction.

In the long time mode, the rotation phase of the head motor 3 is changed by the mode selector 15; and the head change-over switch 6 operates, making the signals reproduced by the heads 2C and 2D into one continuous wave signal. With that exception, the reproducing operation in the long time mode is carried out in the same manner as in the short time mode. The recording track pattern is also the same as in the short time mode except that the TP and the inclination of the recording tracks A1, A2, A3, B1, B2, B3 differ from those obtained in the short time mode. Therefore, further details of the operation in the long time mode are omitted from the description here.

Figure 3:
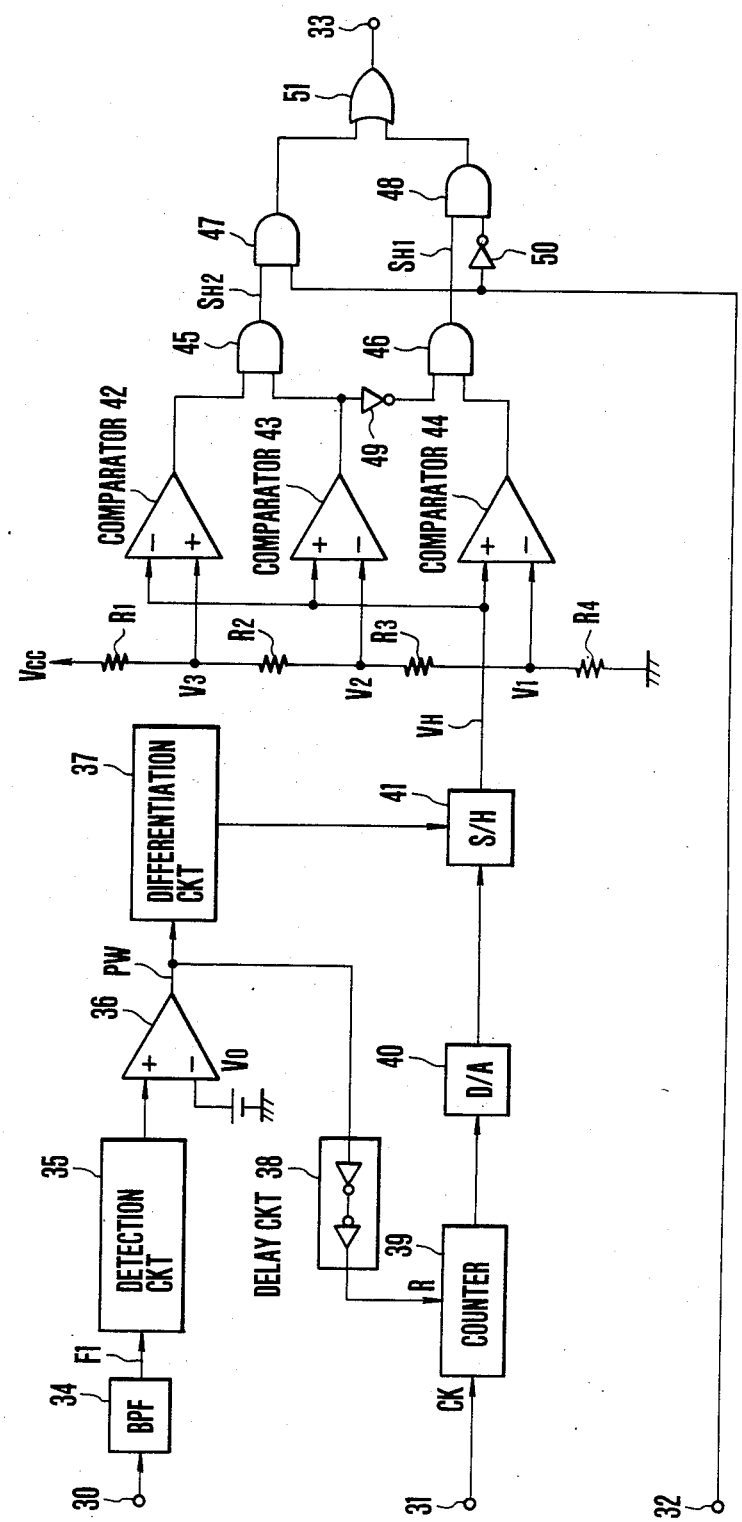
FIG. 3 is a diagram showing details of the error detection circuit of FIG. 1.

The error determining circuit 14 of FIG. 1 operates as follows: FIG. 3 shows, by way of example, the details of the error determining circuit 14. FIGS. 4(a)-4(d) show varied conditions obtained on the magnetic tape 1 when the record in the recording tracks A1, A2, A3, B1, B2, B3 is reproduced in varied modes. FIGS. 5(a)-5(i) show, in a timing chart, the operation of the circuit shown in FIG. 3. For the sake of simplification, the following description is made on the assumption that the TP in the short time mode is twice the TP in the long time mode and that the width of the heads 2A and 2B is twice the width of the heads 2C and 2D: In FIGS. 4(a)-4(d), full lines indicate the boundary lines between recording tracks A1, A2, A3, B1, B2, B3 and broken lines the tracing loci of the reproducing head obtained during reproduction.

Figure 4A:
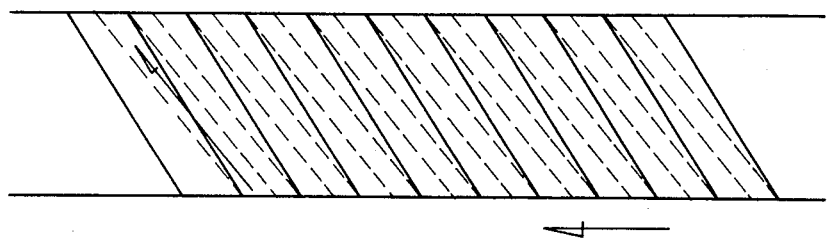
FIGS. 4(a)-4(d) are illustrations showing recording tracks recorded on a magnetic tape in different modes in a state of being reproduced in the different modes.

First, let us consider a case where a record recorded on the magnetic tape 1 in the short time mode is reproduced in the long time mode. In this case, the recording tracks A1, A2, A3, B1, B2, B3 and the tracing loci of the head for reproduction are as shown in FIG. 4(a). Again referring to FIG. 3, a terminal 30 receives the reproduced pilot signals f1, f2, f4, and f3 from the LPF 12 of FIG. 1. The reproduced pilot signals f1, f2, f4 and f3 are supplied to a band-pass filter 34 (hereinafter referred to as BPF) and only one of the pilot signal components f1, f2, f3 and f4 is extracted through the BPF 34. Assuming that the pilot signal component to be extracted is, for example, f1, the embodiment operates as follows: The extracted pilot signal f1 is envelope detected by a detection circuit 35. The wave form of the output of this detection circuit 35 becomes, for example, as shown in FIG. 5(a). A comparator 36 compares the output of the circuit 35 with a reference voltage Vo. The output of the comparator 36 is as shown in FIG. 5(b). Another terminal 31 receives the signal FG produced from the fly-wheel rotation detector 10 of FIG. 1. The signal FG is counted by a counter 39. The counter 39 is reset by the output of the above-stated comparator 36 after the output has been delayed for a derivative action time by a delay circuit 38. A D/A converter 40 digital-to-analog converts (A/D converts) the output of the counter 39. The output of the D/A converter 40 is as shown in FIG. 5(c).

Figure 4B:
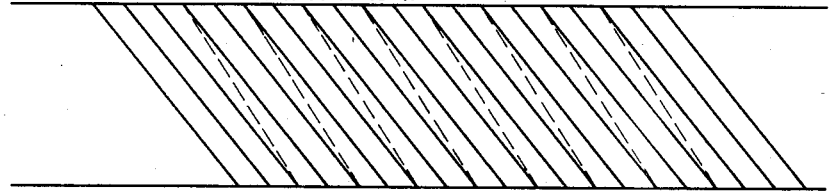

In the event that a record recorded on the magnetic tape 1 in the long time mode is to be reproduced in the short time mode, the recording tracks A1, A2, A3, B1, B2, B3 on the magnetic tape 1 and the tracing loci for reproduction are shown in FIG. 4(b). In this instance, the output of the detection circuit 35, that of the comparator 36 and that of the D/A converter 40 become as shown in FIGS. 5(d), 5(e) and 5(f).

Figure 4C:
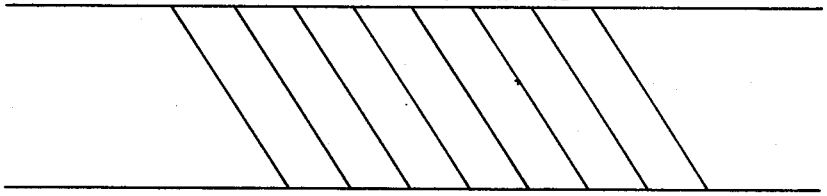
Figure 4D:
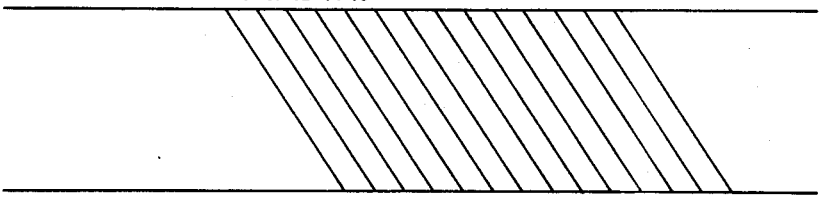

In cases where a record recorded on the magnetic tape 1 in the short time mode is reproduced in the short time mode and where a record recorded in the long time mode is reproduced in the long time mode, conditions obtained on the magnetic tape 1 are shown in FIGS. 4(c) and 4(d). In that instance, the wave forms of the outputs of the detection circuit 35, the comparator 36 and the D/A converter 40 are shown in FIGS. 5(g), 5(h) and 5(i), in which full lines indicate the wave forms obtained in the long time mode and broken lines the wave forms obtained in the short time mode.

The maximum value of the output of the above-stated D/A converter 40 becomes, regardless of the reproduction tape speed, a voltage between voltage values V2 and V3 as shown in FIGS. 5(a)-5(i) when recording in the short time mode and a voltage between values V1 and V2 as shown in FIGS. 5(a)-5(i) when recording in the long time mode. The value V3 represents the output voltage of the D/A converter 40 produced by counting the whole signal FG obtained while the magnetic tape 1 is moved an extent of 4 TP in the short time mode. The value V2 represents the output voltage of the D/A converter 40 produced by counting the whole signal FG while the magnetic tape 1 is also moved the extent of 4 TP in the long time mode. Another value V1 represents, for example, the output voltage of the converter 40, which is produced by counting the whole signal FG obtained while the magnetic tape 1 is moved an extent of 2 TP in the long time mode. This value V1 is suitably determined based on the head widths of the heads 2A, 2B, 2C and 2D.

Therefore, when the maximum value of the output voltage of the D/A converter 40 is between the values V2 and V3 during a reproducing operation with the short time mode selected by the mode selector 15, the mode in which the reproducing operation is being performed is in agreement with the mode in which recording has been performed. If the value is between the values V1 and V2, the recording and reproduction modes are not in agreement. Furthermore, if the value is either above the value V3 or below the value V1, the magnetic tape 1 either has no record or has a record recorded in a mode different from the long time mode and the short time mode.

Meanwhile, when reproducing with the long time mode selected by the mode selector 15, the reproduction mode is not in agreement with the recording mode if the maximum value of the output voltage of the D/A converter 40 is between the values V2 and V3 and is in agreement with the recording mode if the maximum value is between the values V1 and V2.

The output of the comparator 36 is supplied to a differentiation circuit 37. The output of the differentiation circuit 37 is supplied, as a sampling pulse, to a sample-and-hold (S/H) circuit 41. The S/H circuit 41 thus samples and holds the output voltage of the D/A converter 40, which is obtained immediately before the D/A converter 40 is reset. The output of the S/H circuit 41 is supplied respectively to comparators 42, 43 and 44 and is compared with the above-stated values V1, V2 and V3 which are obtained by voltage dividing a power supply voltage Vcc through resistors R1-R4. When a record recorded in the short time mode on the magnetic tape 1 is reproduced, the comparators 42, 43 and 44 produce high level outputs. Then, an inverter 49 produces no high level output. This causes an AND circuit 45 to produce a high level output with another AND circuit 46 produces no high level output. During reproduction of a record recorded in the long time mode on the magnetic tape 1, the comparators 42 and 43 produce no high level outputs while the comparator 44 and the inverter 49 respectively produce high level outputs. Accordingly, in this instance, the AND circuit 45 produces no high level output while the AND circuit 46 produces a high level output.

A terminal 32 receives a signal from the mode selector 15. The signal supplied to the terminal 32 is at a high level during reproduction in the short time mode and at a low level during reproduction in the long time mode. Therefore, when a record recorded in the long time mode on the magnetic tape 1 is reproduced in the long time mode, the terminal 32 receives a low level signal while the AND circuit 45 produces a high level output. Accordingly, AND circuits 47 and 48 produce no high level signal. An OR circuit 51 then also produces no high level output. During reproduction in the short time mode of a record recorded in the short time mode on the magnetic tape 1, the OR circuit 51 also produces no high level output. In the event of a mode discrepancy between recording and reproduction, either the AND circuit 47 or the AND circuit 48 produces a high level output, causing the OR circuit 51 to also produce a high level output. Then, the high level output of the OR circuit 51 is supplied via a terminal 33 to the capstan control circuit 11. With the high level output produced from the OR circuit 51, the capstan control circuit 11 causes the capstan 7 to change the tape moving speed from the speed for the long time mode to the speed for the short time mode or from the short time mode speed to the long time mode speed. When this shifting signal (hereinafter referred to as a mode error signal) is supplied to the capstan control circuit 11, the capstan 7 is rotated at the shifted moving speed over a predetermined period of time (until a related servo system is stablized).

When the VTR is provided with the reproduction system which is described above, the distance between the recording tracks A1, A2, A3, B1, B2, B3 can be detected by virtue of the tracking pilot signals f1, f2, f4 and f3 superimposed on the video signal even with no control signal recorded at an end of the tape 1 for the purpose of tracking control. Therefore, reproduction can always be performed at a tape moving speed corresponding to the TP determined at the time of recording. The embodiment thus ensures that reproduction can always be automatically carried out satisfactorily.

Furthermore, the relation between the recording tracks A1, A2, A3, B1, B2, B2 and the tracing loci for reproduction, which is shown in FIGS. 4(a)–4(d) is not limited to the phasic relationship illustrated. However, under any phasic relationship, the maximum output of the D/A converter 40 is between the values V2 and V1 for a record recorded in the long time mode and between the values V3 and V2 for a record recorded in the short time mode. Furthermore, since this relation is obtained regardless of the tape moving speed used for reproduction, the above detecting arrangement enables the VTR to always perform varied speed reproduction at a tape speed suited for the TP.

In the embodiment described above, the signal FG of the capstan 7 is produced when the tape moving signal corresponding to the operation of the record bearing medium moving means is counted. However, this arrangement may be replaced with an arrangement to obtain a voltage required for the detection or judgement by obtaining a signal proportional to the rotational frequency of the capstan 7 and by accumulating it for the repeating period of the pilot signals f1, f2, f4 and f3 or for a period of time corresponding thereto by means of a capacitor or the like.

Figure 6:
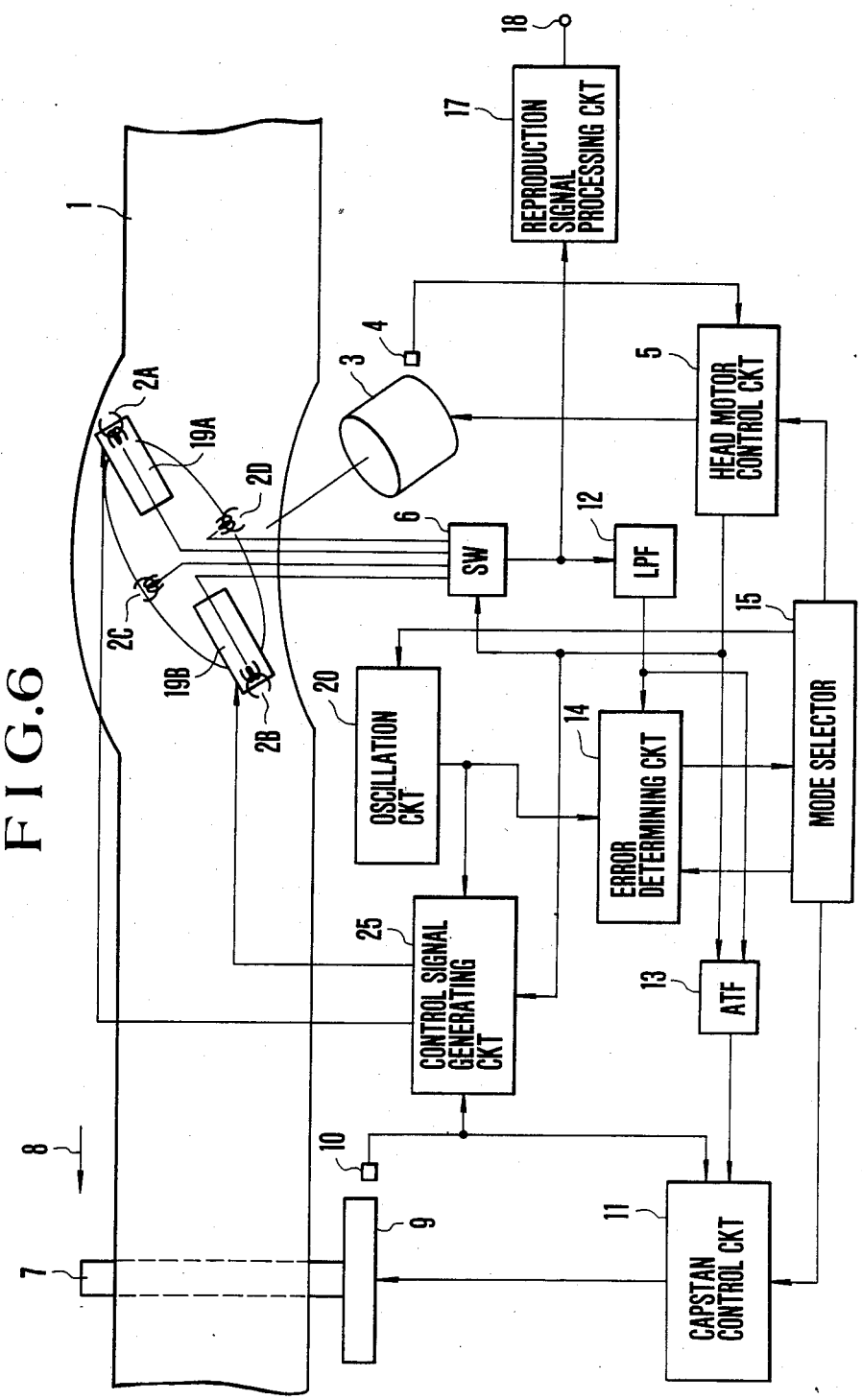
FIG. 6 is a schematic diagram of a reproducing system of a VTR arranged according to the invention in another embodiment thereof.

FIG. 6 shows the outline of a reproduction system of a VTR arranged in another embodiment of the invention. The same component elements as those shown in FIG. 1 are identified by the same reference numerals and are omitted from description here. In this case, the heads 2A and 2B are mounted on one end of each of head shifting means 19A and 19B, which are bi-morph elements or the like. The head shifting means 19A, 19B permits use of the heads 2A and 2B for varied speed reproduction. Reproducing operations both in the long and short time modes are performed with the positions of these heads 2A, 2B shifted by the bi-morph elements 19A and 19B in response to a control signal which will be described later. The heads 2A and 2C have the same azimuth angle and the heads 2B and 2D also have the same azimuth angle. The head changeover switch 6 is operated based on a rectangular wave signal of 30 Hz (hereinafter referred to as 30 PG) produced by the head motor control circuit 5 depending on the pulses produced by the rotation detector 4. An oscillation circuit 20 selectively supplies a plurality of different frequency signals to the error determining circuit 14 in response to the output of the mode selector 15. A control signal generating circuit 25 produces the above-stated control signal for controlling the bi-morph elements 19A and 19B based on the signal FG and the output of the oscillator 20. In the event of varied speed reproducing operations, the recording tracks A1, A2, A3, B1, B2, B3 were traced by the heads 2A and 2B, whether the reproducing operations are to be performed in the long time mode or in the short time mode. In that instance, the order of the pilot signals f1, f2, f4 and f3 obtained from the reproduced signal RF changes. Therefore, the ATF circuit 13 copes with this change.

The control signal to be supplied to the bi-morph elements 19A and 19B during the varied speed reproducing operation is arranged as follows: The inclination of the control signal is obtained by subtracting a signal which has an inclination corresponding to the recording TP from a signal which has an inclination corresponding to the moving speed of the magnetic tape 1, as mentioned in the foregoing. The signal which has the inclination corresponding to the tape speed is obtained by counting the pulse signal FG. The signal which has the inclination corresponding to the TP is obtained by obtaining a signal having an oscillation frequency corresponding to the TP and by counting this signal.

Figure 7:
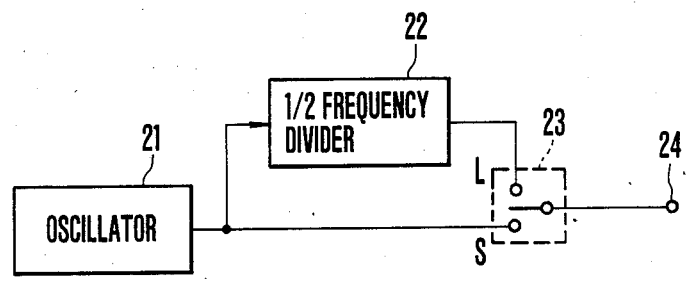
FIG. 7 is a diagram showing, by way of example, the arrangement of an oscillation circuit shown in FIG. 6.

FIG. 7 shows by way of example the details of the oscillation circuit 20 shown in FIG. 6. The output of an oscillator 21 is produced as it is in the case of the short time mode or is produced after the output is frequency divided by a ½ frequency divider 22. More specifically, in case that the mode selector 15 designates a varied speed reproducing operation in the short time mode, the switch 23 is connected to one side S thereof. When the mode selector 15 designates varied speed reproduction in the long time mode, the switch 23 is connected to another side L.

The control signal generating circuit 25 subtracts a signal which is obtained by counting the output of the oscillation circuit 20 from a signal which is obtained by counting the signal FG. The circuit 25 thus produces a control signal by shifting the output thereof to a degree corresponding to nTP at every 30 PG.

The error determining circuit 14 of this embodiment is similar to the circuit arrangement shown in FIG. 3 and thus does not require further description except that the terminal 31 in this case is arranged to receive a signal produced from the oscillation circuit 20 instead of the capstan signal FG.

Further, in the event of varied speed reproduction, such as reproduction at a speed increased by n times, for example, the power supply voltage Vcc to be supplied to one terminal of the resistor R1 of FIG. 3 is voltage divided into 1/n to make the value V3 into V3/n, the value V2 into V2/n and another value V1 into V1/n respectively. Then, the varied speed reproducing operation can be performed in the same manner as the reproducing operation described in the foregoing. It is also possible to carry out the varied speed reproduction likewise by multiplying the oscillation frequency of the oscillator 21 by the value n.

In accordance with the arrangement of this embodiment, a control signal to be applied to the head shifting means can be obtained for the varied speed reproduction and a control signal of the reproducing operation mode designating means can be obtained according to the recording TP by virtue of the oscillating means which has a plurality of different oscillation frequency values and by effectively utilizing the pilot signals superimposed on the recording tracks. The arrangement of this embodiment thus permits an information signal reproducing apparatus to automatically accomplish reproduction always in a satisfactory manner.

Further, in case where reproduction is to be carried out with the capstan signal FG used for detection as in the case of the embodiment shown in FIG. 1, it is of course possible to have the reproducing heads arranged to be shifted by the shifting means in the same manner as shown in FIG. 6. Thus, it goes without saying that various embodiments of the invention are possible by combining in varied manners the embodiments shown in FIGS. 1 and 6.

What is claimed is:

1. An information signal reproducing apparatus arranged to reproduce an information signal from recording tracks formed on a record bearing medium one after another in a direction intersecting the moving direction of the record bearing medium with a plurality of kinds of pilot signals repeatedly superimposed on the information signal, comprising:
   (a) moving means for moving said record bearing medium in the direction intersecting said recording tracks;
   (b) first generating means for generating a first cyclic signal having a cycle corresponding to a moving speed of said moving means performed on the record bearing medium;
   (c) reproducing means for reproducing signals from said record bearing medium;
   (d) second generating means for generating a second cyclic signal having a cycle corresponding to a recurrent period of one of said plurality of kinds of pilot signals in the signals reproduced by said reproducing means; and
   (e) discriminating means for discriminating the pitch of said recording tracks by using the first and second cyclic signals.

2. An apparatus according to claim 1, wherein said second generating means includes a separating circuit which is arranged to separate only one of said pilot signals from signals reproduced by said reproducing means.

3. An apparatus according to claim 1, wherein said first cyclic signal is a clock pulse signal; and said discriminating means includes a counter which counts said first cyclic signal for a period of time determined according to the cycle of said second cyclic signal.

4. An apparatus according to claim 3, wherein said discriminating means further includes a sampling circuit which samples the maximum value of count data obtained by said counter within each cycle of said second cyclic signal.

5. An apparatus according to claim 4, wherein said discriminating means further includes a sampling pulse generating circuit which forms a sampling pulse for said sampling circuit on the basis of said second cyclic signal.

6. An apparatus according to claim 1, further comprising speed control means which controls a moving speed of said record bearing medium moved by said moving means on the basis of an output of said discriminating means.

7. An apparatus according to claim 6, further comprising phase control means which controls the moving phase of said record bearing medium moved by said moving means, said phase control being performed by using said different pilot signals reproduced by said reproducing means.

8. An apparatus according to claim 1, wherein said record bearing medium is a magnetic tape, said moving means includes a capstan for transporting the magnetic tape in the longitudinal direction thereof, and said first generating means includes a detector for detecting a rotating speed of the capstan to generate the first cyclic signal.

9. An information signal reproducing apparatus arranged to reproduce an information signal from recording tracks formed on a record bearing medium one after another in a direction intersecting a moving direction of the record bearing medium with a plurality of kinds of pilot signals repeatedly superimposed on the information signal, comprising:
   (a) moving means for moving said record bearing medium in the direction intersecting said recording tracks;
   (b) reproducing means for reproducing signals from said record bearing medium;
   (c) first generating means for generating a first cyclic signal having a cycle corresponding to a moving speed of said moving means performed on said record bearing medium;
   (d) second generating means for generating a second cyclic signal having a cycle corresponding to a recurrent period of one of said plurality of kinds of pilot signals in the signals reproduced by said reproducing means; and
   (e) mode selection means for changing a mode of the apparatus between said first and second modes on the basis of a difference in cycle between said first and second cyclic signals, said moving means being arranged to move said record bearing medium at a first speed in said first mode and at a second speed in said second mode, said second speed being faster than said first speed.

10. An apparatus according to claim 9, wherein said reproducing means includes a head for said first mode and a head for said second mode; and said selection means is arranged to select for reproduction either the head for the first mode or the head for the second mode.

11. An apparatus according to claim 9, wherein said reproducing means includes a rotating head and shifting means for shifting said rotating head in a direction intersecting the rotating plane thereof; the extent of shifting by said shifting means is arranged to be changed by said mode selection means.

12. An apparatus according to claim 9, wherein said record bearing medium is a magnetic tape, said moving means includes a capstan for transporting the magnetic tape in the longitudinal direction thereof, and said first generating means includes a detector for detecting a rotating speed of the capstan to generate the first cyclic signal.

13. An information signal reproducing apparatus arranged to reproduce an information signal from recording tracks formed on a record bearing medium one after another in a direction intersecting a moving direction of the record bearing medium with a plurality of kinds of pilot signals repeatedly superimposed on the information signal, comprising:

(a) a rotating head arranged to reproduce signals by tracing said recording tracks;

(b) shifting means for shifting said rotating head in a direction intersecting a rotating plane thereof;

(c) designating means for designating a reproducing mode corresponding to a pitch of said recording tracks;

(d) moving means for moving said record bearing medium in the direction intersecting said recording tracks;

(e) first generating means for generating a first cyclic signal having a cycle which changes according to said reproducing mode;

(f) second generating means for generating a second cyclic signal having a cycle corresponding to a recurrent period of one of said plurality of kinds of pilot signals in the signals reproduced by said rotating head;

(g) first control means for generating a control signal for controlling said shifting means by using said first cyclic signal; and (h) second control means for controlling said designating means by using said first and second cyclic signals.

14. An apparatus according to claim 13, wherein said second generating means includes a separating circuit which is arranged to separate only one of said pilot signals from signals reproduced by said rotating head.

15. An apparatus according to claim 13, wherein said first cyclic signal is a clock pulse signal; and said second control means includes a counter which counts said first cyclic signal for a period of time determined in relation to the cycle of said second cyclic signal.

16. An apparatus according to claim 15, wherein said second control means further includes a sampling circuit which samples the maximum value of count data obtained by said counter within each cycle of said second cyclic signal.

17. An apparatus according to claim 14, wherein said second control means further includes a sampling pulse generating circuit which forms a sampling pulse for said sampling circuit on the basis of said second cyclic signal.

18. An apparatus according to claim 13, further comprising third generating means for generating a third cyclic signal having a cycle relative to the record bearing medium moving action of said moving means; and wherein said first control signal is formed by using said first and third cyclic signals.

19. An apparatus according to claim 18, wherein a travelling speed of said record bearing medium moved by said moving means varies with the reproducing mode designated by said designating means.

20. An information signal reproducing apparatus arranged to reproduce an information signal from recording tracks formed on a record bearing medium one after another in a direction intersecting a moving direction of the record bearing medium with a plurality of kinds of pilot signals repeatedly superimposed on the information signal, comprising:

(a) a rotating head arranged to reproduce signals by tracing said record bearing medium;

(b) shifting means for shifting said rotating head in a direction intersecting a rotation plane thereof;

(c) designating means for designating a reproducing mode corresponding to a pitch of said recording tracks on the basis of a recurrent period of one of said plurality of kinds of pilot signals in the signals reproduced by said rotating head;

(d) first generating means for generating a first cyclic signal having a cycle varying according to said reproducing mode;

(e) moving means for moving said record bearing medium in the direction intersecting said recording tracks at a speed according to said reproducing mode;

(f) second generating means for generating a second cyclic signal having a cycle relative to a record bearing medium moving action of said moving means; and (g) control means for generating a control signal for controlling said shifting means by using said first and second cyclic signals.

* * * * *